United States Patent [19]
Stephanoff

[11] 3,788,447
[45] Jan. 29, 1974

[54] LINEAR MOTOR CONVEYOR
[75] Inventor: Louis J. Stephanoff, Indianapolis, Ind.
[73] Assignee: FMC Corporation, San Jose, Calif.
[22] Filed: July 3, 1972
[21] Appl. No.: 268,389

[52] U.S. Cl. .................. 198/41, 198/189, 198/203, 310/12
[51] Int. Cl... B65g 17/46, B65g 23/00, H02k 41/02
[58] Field of Search.......... 198/41, 177 R, 189, 203; 310/12–13; 318/135

[56] References Cited
UNITED STATES PATENTS
3,426,887 2/1969 Ward .............................. 198/177 R
2,915,169 12/1959 Abbey............................. 198/177 R

*Primary Examiner*—Edward A. Sroka
*Attorney, Agent, or Firm*—F. W. Anderson et al.

[57] ABSTRACT

A linear motor conveyor has an endless guide support in which stators of linear motors are housed. Conveyor segments are pivotally linked together in an endless loop for articulating movement, either horizontally or vertically, or both, along the endless path defined by the guide support. The conveyor segments, which have an armature portion extending through slots in the guide support, are retained in the guide support in every orientation of the conveyor by laterally extending portions including a load bearing portion. The conveyor is propelled along the guide track by virtue of the electromagnetically coupling of the linear motor stators with the armature portions of the conveyor segment loop.

13 Claims, 8 Drawing Figures

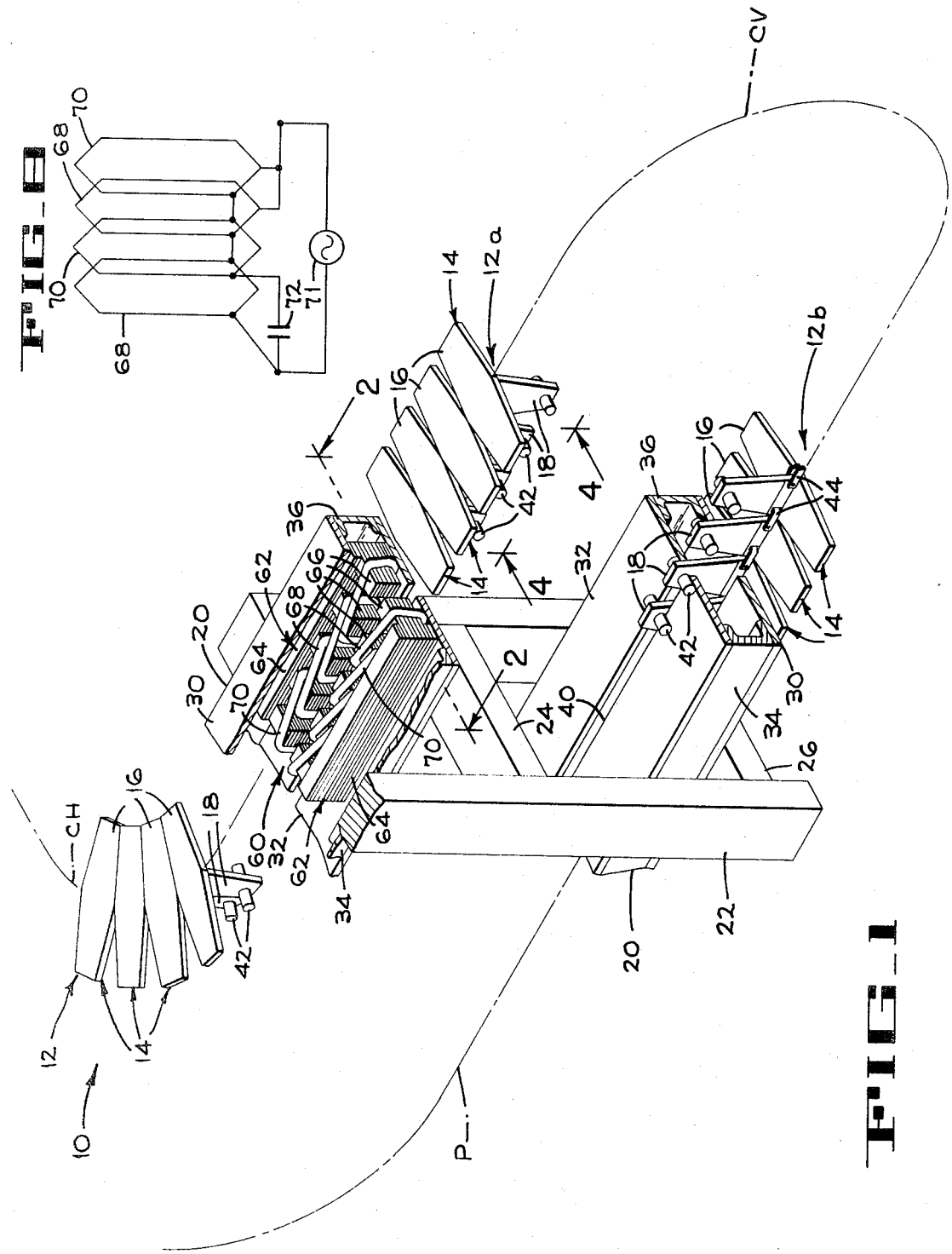

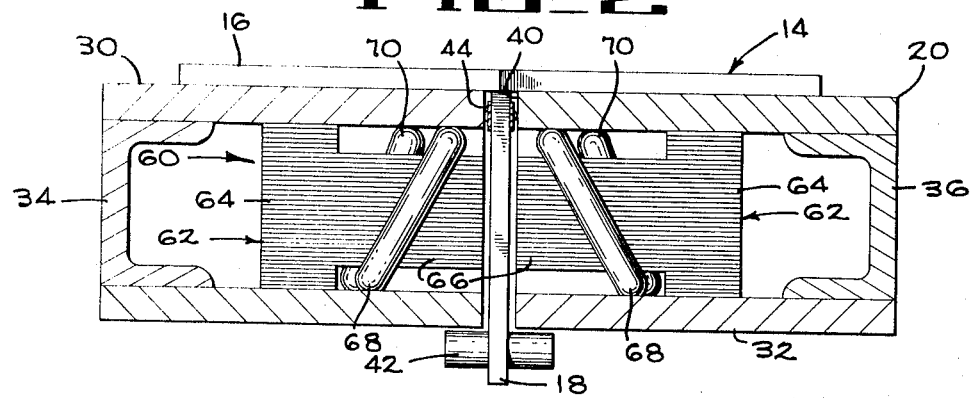
FIG_2
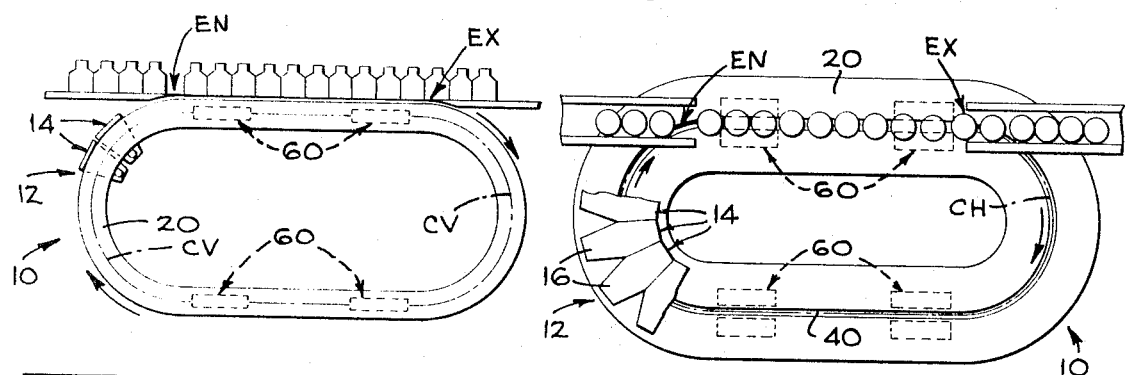
FIG_6  FIG_7
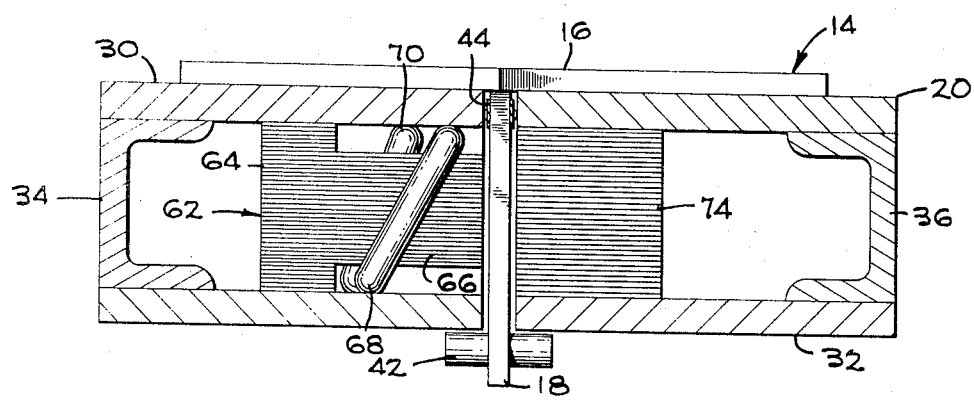
FIG_3

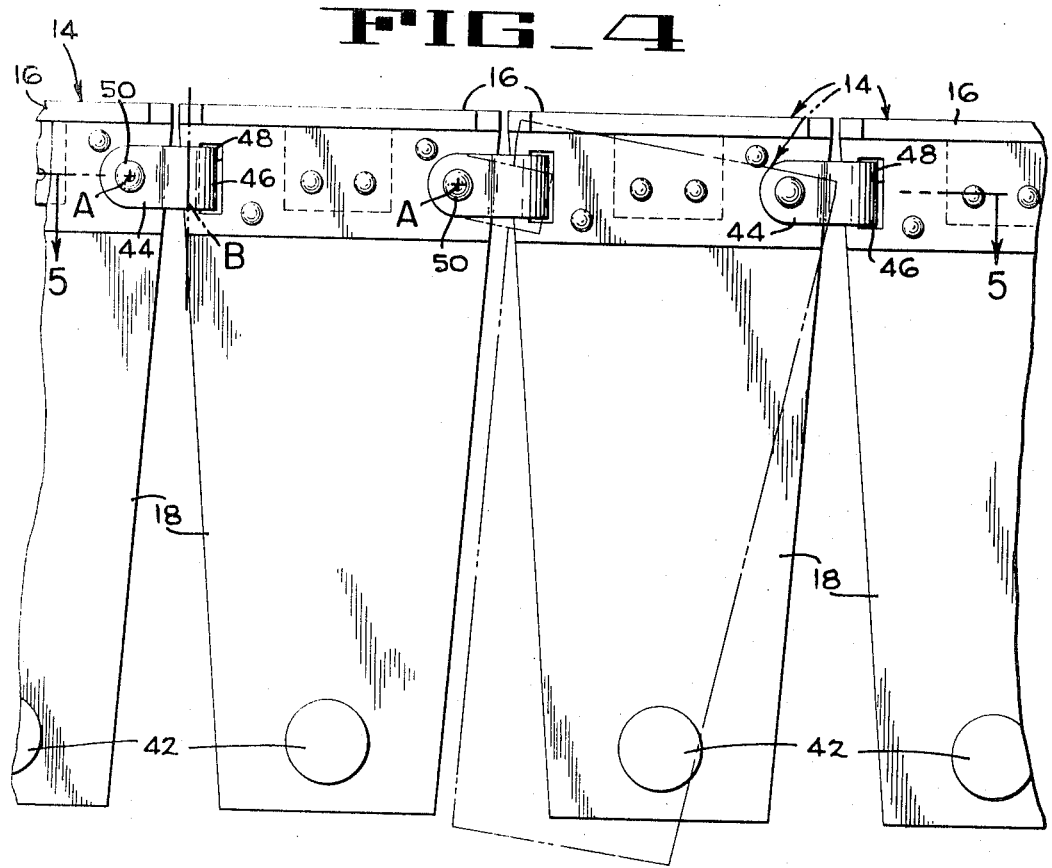
FIG_4
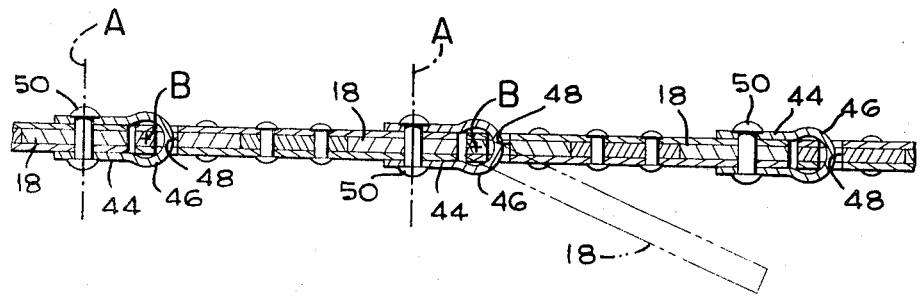
FIG_5

LINEAR MOTOR CONVEYOR

BACKGROUND OF THE INVENTION

The present invention relates to a conveyor which is driven by a linear electromagnetic device.

Linear induction motors, which utilize the same electromagnetic principles as the common rotary electric induction motor, are not new. The usual linear induction motor has a stationary stator, corresponding to the stator of a rotary electric induction motor, but which is laid out along a linear path instead of encircling a rotary path. In a linear induction motor, a straight elongated non-magnetic, electrical conducting member, such as a copper or aluminum bar, serves as the armature which is electromagnetically coupled by a traveling magnetic field produced by the stator for the production of eddy currents in the armature and the development of a force between the stator and the armature along a linear path adjacent the stator. The U.S. Pats. Nos. 3,333,124 and 3,335,300 show linear motors of this type.

It has heretofore been proposed to situate stationary stators adjacent elongated endless conveyor members having armature portions for electromagnetic coupling of the stators with the conveyor members. In some systems, the endless conveyor member is a belt (see Ward U.S. Pat. No. 3,426,887). In at least two systems (the Polgreen U.S. Pat. No. 3,158,765 and the Ward et al. U.S. Pat. No. 3,426,887) the conveyor members are segments pivotally connected together. To carry the load to be transported, the Polgreen patent contemplates vehicles which are linked together and the Ward patent contemplates a conveyor chain from which articles can be suspended.

SUMMARY OF THE INVENTION

In the present invention there is provided a linear motor conveyor with an improved loop of conveyor segments. In the preferred form of the invention, an endless guide support, which is in the form of an elongated rectangular housing, has a central elongated slot therethrough. Each conveyor segment has a vertical armature portion extending through the slot. At one end of the armature portion, and outside the guide support housing, is a flat plate perpendicular to the armature to receive an article to be transported. Retainer pins are mounted at the opposite end of the armature portion to extend outside the guide support housing on the opposite side to the load plate. Linear motor stators are mounted in the guide support housing, adjacent the slot through which the armature portion of the conveyor segments extend, for electromagnetic coupling with the armature portions to propel the conveyor with respect to the guide support housing.

The armature portion and the plate portion are shaped to permit relative pivotal movement, without overlapping, between adjacent conveyor segments. The segments are also linked together for pivotal movement in mutually perpendicular planes so that, if desired, the conveyor loop can bend in a horizontal plane and/or in a vertical plane.

With this construction, the path of the conveyor segments can be in the form of a vertical loop, a horizontal loop, or a combination of both. The endless conveyor loop will be held on its path in any orientation thereof by virtue of the guide support and the conveyor segment construction whereby said members are coupled to prevent separation but yet permit free articulated movement. At all times the conveyor segments will be electrically coupled to the stators even though the stators are positioned out of the way of the load carrying plates. Since the armature portions of the conveyor segments are perpendicular to the load bearing surfaces, deflection of the conveyor segments under load will not diminish or impair the electromagnetic coupling between the conveyor segments and the stators.

It is therefore one object of the present invention to provide an improved linear motor conveyor.

It is another object of the present invention to provide a linear motor conveyor with pivotally connected conveyor segments which can be deflected in mutually perpendicular planes.

It is yet another object of the present invention to provide linear motor conveyor with pivotally connected conveyor segments which are coupled to a guide support to retain the conveyor at the support while permitting free longitudinal movement of the conveyor segments relative to the support.

BRIEF DESCRIPTION OF THE DRAWINGS

FIG. 1 is a fragmentary view of the linear motor conveyor of the present invention, with parts broken away for clarity.

FIG. 2 is a view taken on the lines 2—2 of FIG. 1.

FIG. 3 is a view taken as the view of FIG. 2 but illustrating a different type of linear motor stator.

FIG. 4 is a view taken on the lines 4—4 of FIG. 1.

FIG. 5 is a view taken on the lines 5—5 of FIG. 4.

FIG. 6 is a schematic side view of the conveyor of the present invention forming an endless loop in a vertical plane to transport articles from an entry point to a discharge point.

FIG. 7 is a schematic plan view of the conveyor of the present invention forming an endless loop in a horizontal plane to transport articles from an entry point to a discharge point.

FIG. 8 is a schematic electrical diagram of the linear electric motor circuit.

DESCRIPTION OF THE PREFERRED EMBODIMENT

There is shown in FIG. 1 the conveyor system 10 of the present invention. The system 10 has an endless flexible conveyor 12 which is made up of individual rigid conveyor segments 14. Each conveyor segment 14 is in the form of a T with a cross-member 16 and a stem 18.

The endless conveyor 12 rides on an endless guide track 20 which is supported on frame members 22 (only one of which is shown). Each frame member 22 has an upper cross support member 24 and a lower cross support member 26. The upper, or transport, run 12a of the conveyor 12 is supported on the upper cross support member 24 and the lower, or return, run 12b of the conveyor 12 is supported on the lower cross support member 26. The path P defined by the endless guide track for the conveyor includes curves CV in a vertical plane and curves CH in a horizontal plane.

The guide track 20 is in the form of an endless tube of rectangular cross-section, with a first support surface 30, a second support surface 32, and two vertical side surfaces 34, 36 extending between the support surfaces. In the track 20, shown in FIG. 1 for illustrative purposes, the support surfaces 30, 32 are, for the most part, horizontal although they will be curved as they guide the conveyor from the upper transport run 12a to the lower return run 12b.

The guide track 20 is made up of two halves spaced apart to define a gap, or slot 40 therebetween. The stem 18 of each conveyor segment 14 extends through slot 40. The cross-member 16 of each conveyor segment on the upper run 12a of the conveyor is supported by the first support surface 30 of the guide track. It will be noted that the support surface 30 of the guide track 20 is the upper support surface on the upper run of the guide track but is the lower support surface of the guide track on the lower run thereof. At the foot of the stem of each conveyor segment (that is, at the end of the stem opposite the cross-member) there is a pin 42 passing laterally through the stem which rides on the second support surface 32 on the lower run of the guide track. It will be noted that the second support surface is the lower surface of the track on the upper run of the guide track 20 and is the upper surface of the track on the lower run of the guide track.

Thus, it will be seen that a continuous endless flexible conveyor 12, made up of individual rigid conveyor segments 14, rides on a continuous endless guide track 20, through horizontal and/or vertical curves CH and CV, respectively. During the upper run of the conveyor, the upper cross-members of the conveyor segments ride on one surface of the guide path which, in the upper run, defines a horizontal surface to support the cross-members in a horizontal plane. The upper surfaces of the cross-members define load bearing plates with flat surfaces to carry the articles, such as bottles, packages, or other loads, which the conveyor is to transport. In the usual installation, as shown in FIG 6, the load is deposited on and removed from the conveyor during the upper run of the conveyor. During the lower run of the conveyor, which, in the installation illustrated in FIG. 1, is the return run, the pins 42 of each conveyor segment ride on the other support surface 32 of the guide track and support each conveyor segment to prevent the conveyor from sagging and becoming disengaged from the track.

An examination of FIG. 1 will reveal that, if desirable, the lower run can be made the transport run and the upper run the return run by merely reversing the orientation of the conveyor segments. In other words, if each conveyor segment is turned upside down, the cross-member 16 will ride on support surface 32 of the guide track during the lower run, and the pins 42 of the conveyor segments will ride on support surface 30 during the upper run. When the conveyor is so oriented, the articles can be transported on the lower run, instead of the upper run, of the conveyor.

As shown best in FIGS. 4 and 5, each stem 18 of the conveyor segment has a clip 44 mounted thereon which terminates in a tubular loop 46 received through an opening 48 in the stem of an adjacent conveyor segment. The clips, which are mounted near the head of the stem 18 just under the cross-member 16, are pivotal on the stem on which they are mounted (by rivet 50) about an axis A. The tubular loop 46 has a longitudinal axis B oriented 90° from the axis A. As shown in FIG. 4, clip 44 can pivot about axis A to swing an adjacent conveyor segment about axis A. Similarly, as shown in FIG. 5, an adjacent conveyor segment can pivot about axis B.

In order to permit flexibility of the conveyor, the stem and cross-member of each conveyor segment are shaped to avoid interference with adjacent conveyor segments. As shown in FIG. 4, the leading and trailing edge of each conveyor segment stem 18 is tapered to produce a narrower foot end which permits a greater pivoting about axis A, and hence a greater flexibility in the vertical plane. The pivoting of one segment relative to the segment to which it is attached is shown in dotted lines. As shown best in FIG. 1, the leading and trailing edges of the cross-member 16 of each conveyor segment is tapered outwardly from the center, to produce outer ends narrower than the center portion, and permit pivoting movement of one segment (shown in dotted lines in FIG. 5) about axis B with respect to the segment to which it is connected. Thus, the clips 44, which connect each conveyor segment to the two adjacent segments, unite the conveyor segments into a continuous, endless, flexible conveyor.

There is provided inside the guide track 20 a plurality of spaced apart linear motors 60. Each motor has a stator 62 with a laminated ferromagnetic core 64. The core has spaced, extending legs 66. Such a stator, and the electric circuitry therefor, is shown in U.S. Pat. No. 3,333,124. The stator has two sets of coils 68, 70 (see FIG. 8) which are wound around the legs 66 of the stator. The coils are connected across a source 71 of single phase AC voltage. One of the sets of coils (70) is connected to the source through a capacitor 72 to produce an electromagnetic field which, in accordance with well known induction motor theory, travels along the legs of the stator. The particular mode of wiring of the stator, as illustrated, is conventional, and the particular details of the stator circuitry form no part of the present invention. Stators 62 may be placed in the track guide 20 on both sides of the slot 40, as shown in FIG. 2, or a laminated core 74 may be mounted in the track guide 20, opposite the stator 62, as shown in FIG. 3, to provide a return path for the electromagnetic flux.

The vertical stem 16 of each conveyor segment is made of a conducting non-magnetic material, such as copper or aluminum, so that a propulsive force will be generated on the segment stem by the traveling field in the stator, as in any induction motor. This propulsive force, which, at any instant, is applied to the particular conveyor segment stems in registration with the linear motor stators at that time, causes the entire conveyor to circulate around the path defined by the guide track.

It will be noted, from FIG. 1, that the guide track and conveyor may take any desired path, with either or both horizontal and vertical curves, because of the construction of the conveyor which permits flexure thereof in mutually perpendicular curves. It will be evident from FIG. 1 (which illustrates a system with compound horizontal and vertical curves), FIG. 6 (which illustrates a system with a vertical curve), and FIG. 7 (which illustrates a system with a horizontal curve) that, in operation, articles, such as bottles, packages, or the like, may be transported on the transport run of the conveyor. The articles are deposited on the conveyor, as shown in FIGS. 6 and 7, at an entry point EN and are discharged therefrom at an exit point EX, by mechanism (not shown). Motors 60 are positioned around the track to provide a driving force at spaced intervals to the conveyor.

Although the best mode contemplated for carrying out the present invention has been herein shown and described, it will be apparent that modification and variation may be made without departing from what is regarded to be the subject matter of the invention.

What is claimed is:

1. A linear electric power conveyor system comprising in combination, an endless guide support having a slot extending vertically therethrough, a stationary winding to generate a field of magnetic flux in portions of said slot, an endless articulated conveyor having means to support a load, said conveyor having an endless array of armature portions extending vertically through said slot for electromagnetic propulsion through the field of magnetic flux.

2. The apparatus of claim 1 in which said means to support a load constitutes flat plates connected, respectively, to said armature portions to support articles thereon.

3. The apparatus of claim 2 in which said armatures are shaped to permit articulation of adjacent armatures in the vertical plane and in which said flat plates are shaped to permit articulation of adjacent plates in the horizontal plane.

4. A linear electric power conveyor system comprising in combination, an endless guide support having vertical and horizontal curves, means to establish a traveling magnetic field along portions of said guide support, an endless array of conveyor segments movably mounted on said guide support and engaged therewith to hold the conveyor segments to the guide support in any attitude of the conveyor segments, said segments pivotally connected together for articulated relative movement in mutually perpendicular planes, at least some of said segments having armature portions extending into said guide support, and at least some of said segments having means to support a load outside of said guide support.

5. A linear electric power conveyor system comprising in combination, an endless guide support, means to establish a traveling magnetic field along portions of said guide support, an endless array of conveyor segments mounted on said guide support, said segments pivotally connected together for articulated relative movement in mutually perpendicular planes, at least some of said segments having means to support a load and at least some of said segments having armature portions extending into said magnetic field, said armature portions extending vertically through said guide support, and said means to support a load constituting flat plates mounted on said armature portions and perpendicular thereto.

6. The apparatus of claim 5 in which said armature portions and said flat plates are tapered to permit articulation thereof.

7. In a linear motor conveyor, an elongated endless guide support having runs with spaced apart horizontal surfaces, each of said surfaces having a longitudinal slot therein, said slots in lateral alignment, a linear motor in said guide support, and an endless array of conveyor segments joined together for articulated movement around said guide support, said segments having vertical armature portions extending vertically through said aligned slots, and having laterally extending portions overlaying each of said horizontal surfaces to hold the conveyor segments in the guide support in any orientation of the conveyor segments.

8. The apparatus of claim 7 wherein one of the laterally extending portions of each conveyor segment is a flat plate to support articles thereon.

9. The apparatus of claim 8 wherein each of said flat plates has tapered edges to avoid interference with adjacent conveyor segment article supporting plates.

10. A linear motor conveyor system comprising in combination, an endless guide support having an upper and a lower run, said guide support having spaced apart surfaces with aligned longitudinal slots therein, an endless articulated conveyor mounted on said guide support, said conveyor consisting of rigid segments pivotally connected to adjacent segments, each segment having a load bearing portion supported by one of the surfaces of the guide support in the upper run and having a retaining portion supported by the other surface of the guide support in the lower run, said conveyor segments having armature portions extending between the load-bearing portions and the retaining portions, said armature portions received in the longitudinal slots of the surfaces of the guide support, and motor stators mounted adjacent the path of said armature portions for electromagnetic coupling therewith.

11. The apparatus of claim 10 in which said load bearing portion of each surface has tapered edges to avoid interference on articulation with load bearing portions of adjacent conveyor segments and in which said armature portions have tapered edges to avoid interference on articulation with armature portions of adjacent conveyor segments.

12. A linear motor conveyor system comprising in combination, an endless tubular guide support having an upper and lower run, said guide support having spaced surfaces with a slot therein extending longitudinally the entire length of the conveyor track, said slot passing vertically through the guide track on at least the upper and lower runs thereof, an endless conveyor mounted on said guide support, said conveyor consisting of rigid segments pivotally connected to adjacent segments, each segment having a load bearing plate with tapered edges supported by one of the surfaces of the guide support in the upper run and having an armature portion with tapered edges extending through said slot, said armature portion having retaining portions extending laterally therefrom to engage the other surface of the guide support on the lower run and support the conveyor, motor stators mounted in the guide track spaced along the path of the endless conveyor for electromagnetic coupling with the armatures of the endless conveyor.

13 A linear electric power conveyor system comprising in combination, an endless guide support having vertical and horizontal curves, electric stators in said guide support to establish a traveling magnetic field inside of portions of said guide support, an endless array of conveyor segments movably mounted on said guide support and engaged therewith to hold the conveyor segments to the guide support in any attitude of the conveyor segments, said segments pivotally connected together for articulated relative movement in mutually perpendicular planes, at least some of said segments having armature portions extending into said guide support, and at least some of said segments having load bearing plates to support a load outside of said guide support.

* * * * *